United States Patent
Huang et al.

(10) Patent No.: US 7,621,177 B2
(45) Date of Patent: Nov. 24, 2009

(54) ATTACHED TIRE PRESSURE SENSOR AND AIR NOZZLE ASSEMBLY

(75) Inventors: Shiao-Hwa Huang, Taichung (TW); Ming-Kuan Liao, Hsinchu County (TW); Kim Y. C. Tsai, Taichung Hsien (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 203 days.

(21) Appl. No.: 11/907,855

(22) Filed: Oct. 18, 2007

(65) Prior Publication Data

US 2008/0258893 A1    Oct. 23, 2008

(30) Foreign Application Priority Data

Apr. 20, 2007   (CN) .................... 2007 2 0143235 U

(51) Int. Cl.
*B60C 23/02* (2006.01)
(52) U.S. Cl. .................... 73/146.8; 73/146
(58) Field of Classification Search ........ 73/146–146.8; 340/442–447
See application file for complete search history.

(56) References Cited

U.S. PATENT DOCUMENTS

| 4,606,391 A | * | 8/1986 | Achterholt | .................. 152/431 |
| 4,819,686 A | * | 4/1989 | Achterholt | .................. 137/229 |
| 5,513,524 A | * | 5/1996 | Rosenfeld | .................. 73/146.3 |
| 7,257,998 B2 | * | 8/2007 | Luce | .................. 73/146.8 |

* cited by examiner

*Primary Examiner*—Andre J Allen
*Assistant Examiner*—Jermaine Jenkins
(74) *Attorney, Agent, or Firm*—Bacon & Thomas, PLLC

(57) ABSTRACT

An attached tire pressure sensor and air nozzle assembly includes an air nozzle for installation in the rim of a vehicle wheel, an attached tire pressure sensor threadedly coupled with the air nozzle for sensing the tire pressure of the vehicle wheel, and an anti-loosing device sandwiched between the air nozzle and the attached tire pressure sensor. The anti-loosing device has a rigid base stopped against the air nozzle, and a curved spring washer stopped against the attached tire pressure sensor to provide a spring force to the air nozzle and the attached tire pressure for preventing the attached tire pressure sensor from loosing from the air nozzle upon receiving vibration or accidental impact of the vehicle wheel during running of the vehicle.

5 Claims, 4 Drawing Sheets

ATTACHED TIRE PRESSURE SENSOR AND AIR NOZZLE ASSEMBLY

BACKGROUND OF THE INVENTION

1. Field of the Invention

The present invention relates generally to vehicle tires and more specifically, to an attached tire pressure sensor and air nozzle assembly.

2. Description of the Related Art

An attached tire pressure sensor and air nozzle assembly is known comprised of an air nozzle, an air valve, and an attached tire pressure sensor. The air nozzle is installed in the rim of a vehicle wheel, having an air passage axially extending through the two distal ends thereof for communication between the inside air pressure of the vehicle wheel and the outside open air. The air nozzle further has an outer thread exposed to the outside of the vehicle wheel. The air valve is mounted in the air passage of the air nozzle, prohibiting leakage of air out of the vehicle wheel. Further, the attached tire pressure sensor comprises a hollow body, and a tire pressure sensor circuit mounted in the hollow body. The hollow body has a coupling hole in communication between the inside space of the hollow body and the atmosphere, and an inner thread formed in the coupling hole.

The inner thread of the attached tire pressure sensor is threaded onto the outer thread of the air nozzle. In addition, a pin in the coupling hole is provided to push the air valve, thereby opening the air valve for allowing air to flow out of the vehicle wheel into the hollow body of the attached tire pressure sensor. Thus, the internal tire pressure sensor circuit of the attached tire pressure sensor measures the tire pressure of the vehicle wheel. If the tire pressure of the vehicle wheel is below a set value, a radio transmitter is induced to transmit a signal to one or two receivers at the chassis of the vehicle, enabling the receivers to send the signal to a display in the vehicle through a cable for display.

It is well known that the wheels of a vehicle frequently produce high-frequency vibration or low-frequency vibration as the vehicle is running over an uneven road surface at a high speed. Further, when a vehicle is running on a rough and rugged road, the wheels may impact the edges of the holes. These vibration and impact may cause loosing of the connection between the inner thread of the attached tire pressure sensor and the outer thread of the air nozzle, and the attached tire pressure sensor may fall from the air nozzle during running of the vehicle.

SUMMARY OF THE INVENTION

The present invention has been accomplished under the circumstances in view. It is the primary objective of the present invention to provide an attached tire pressure sensor and air nozzle assembly, which eliminates the drawback of the aforesaid prior art design.

The technical measure to achieve the aforesaid objective is the use of an anti-loosing device set between the air nozzle and the attached tire pressure sensor to ensure the attached tire pressure sensor to be firmly coupled with the air nozzle.

The anti-loosing device comprises a rigid base stopped against the air nozzle and a curved spring washer stopped against the attached tire pressure sensor. The rigid base has a first side, a second side opposite to the first side, and a coupling hole cut through the first side and the second side. The curved spring washer has at least one portion thereof fixedly bonded to the first side of the rigid base.

After installation of the anti-loosing device in between the air nozzle and the attached tire pressure sensor, the rigid base and the curved spring washer are respectively stopped against the air nozzle and the attached tire pressure sensor to give a spring force to the air nozzle and the attached tire pressure sensor, thereby holding down the attached tire pressure sensor and the air nozzle and preventing the attached tire pressure sensor from losing from the air nozzle upon receiving vibration or accidental impact of the vehicle wheel during running of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
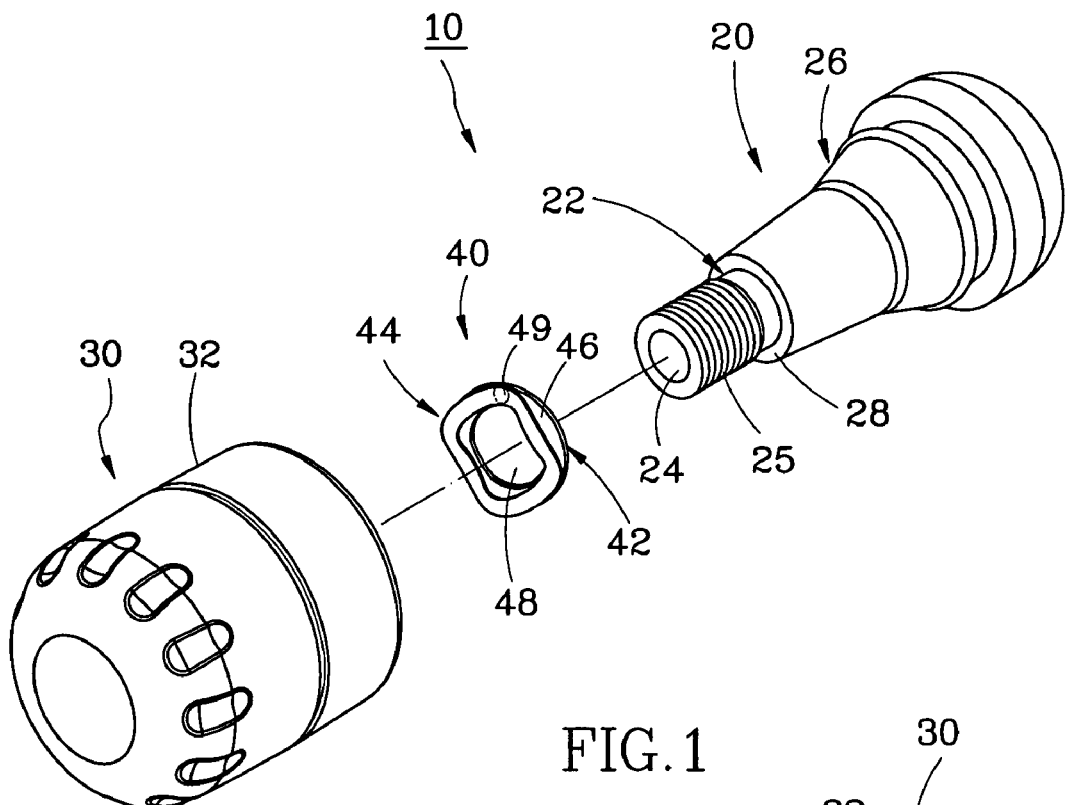
FIG. 1 is an exploded view of an attached tire pressure sensor and air nozzle assembly in accordance with a first exemplary embodiment of the present invention.
Figure 2:
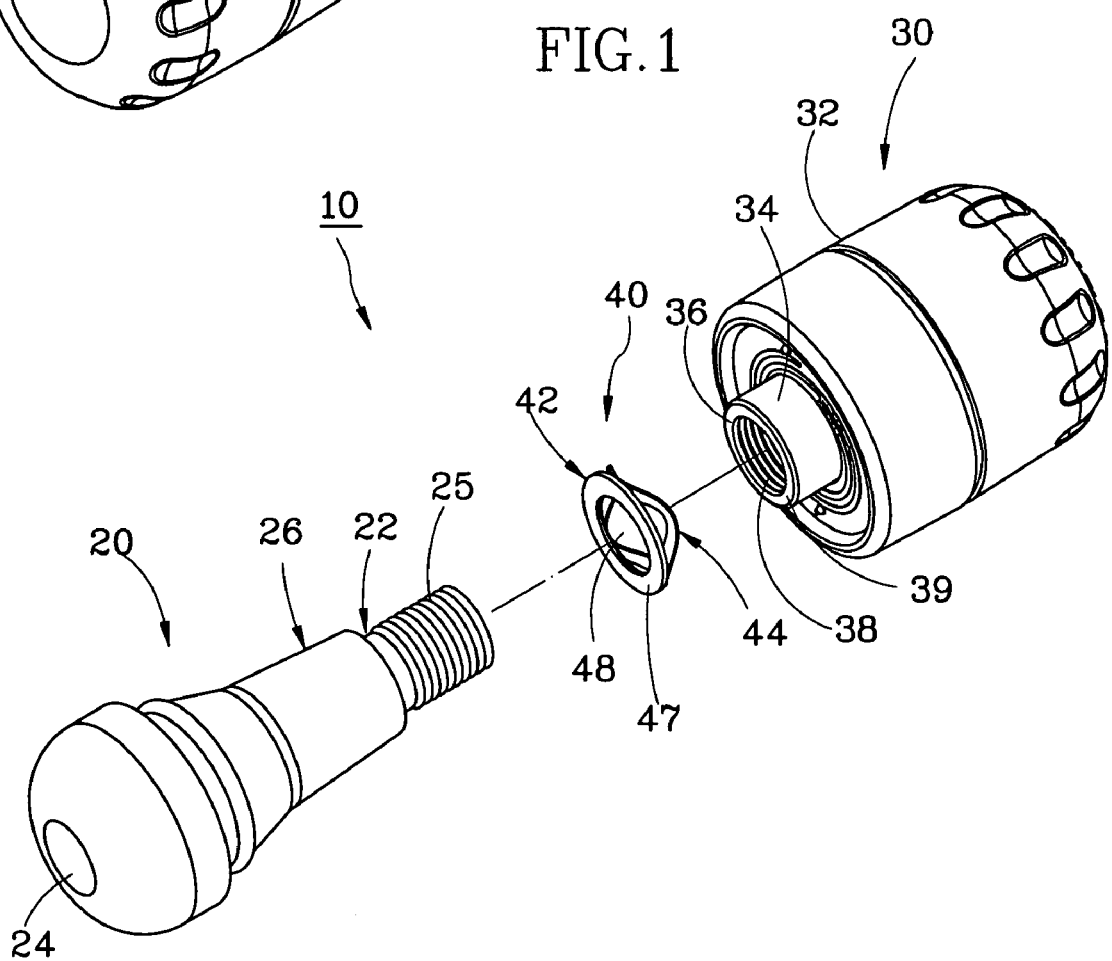
FIG. 2 corresponds to FIG. 1 when viewed from another angle.
Figure 3:
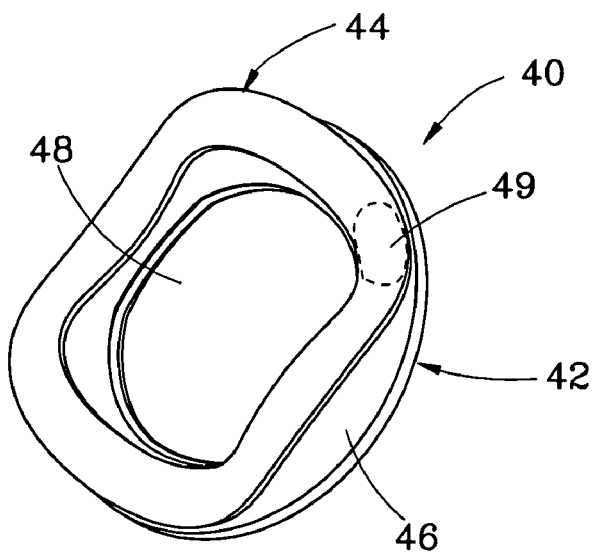
FIG. 3 is a perspective view in an enlarged scale of the anti-loosing device of the attached tire pressure sensor and air nozzle assembly in accordance with the first exemplary embodiment of the present invention.
Figure 4:
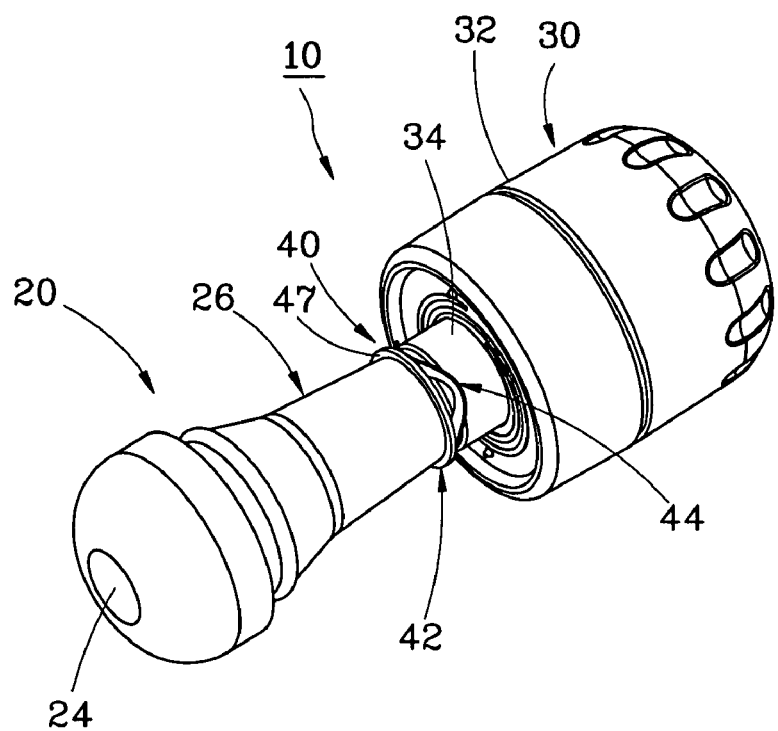
FIG. 4 is a perspective assembly view of the attached tire pressure sensor and air nozzle assembly in accordance with the first exemplary embodiment of the present invention.
Figure 5:
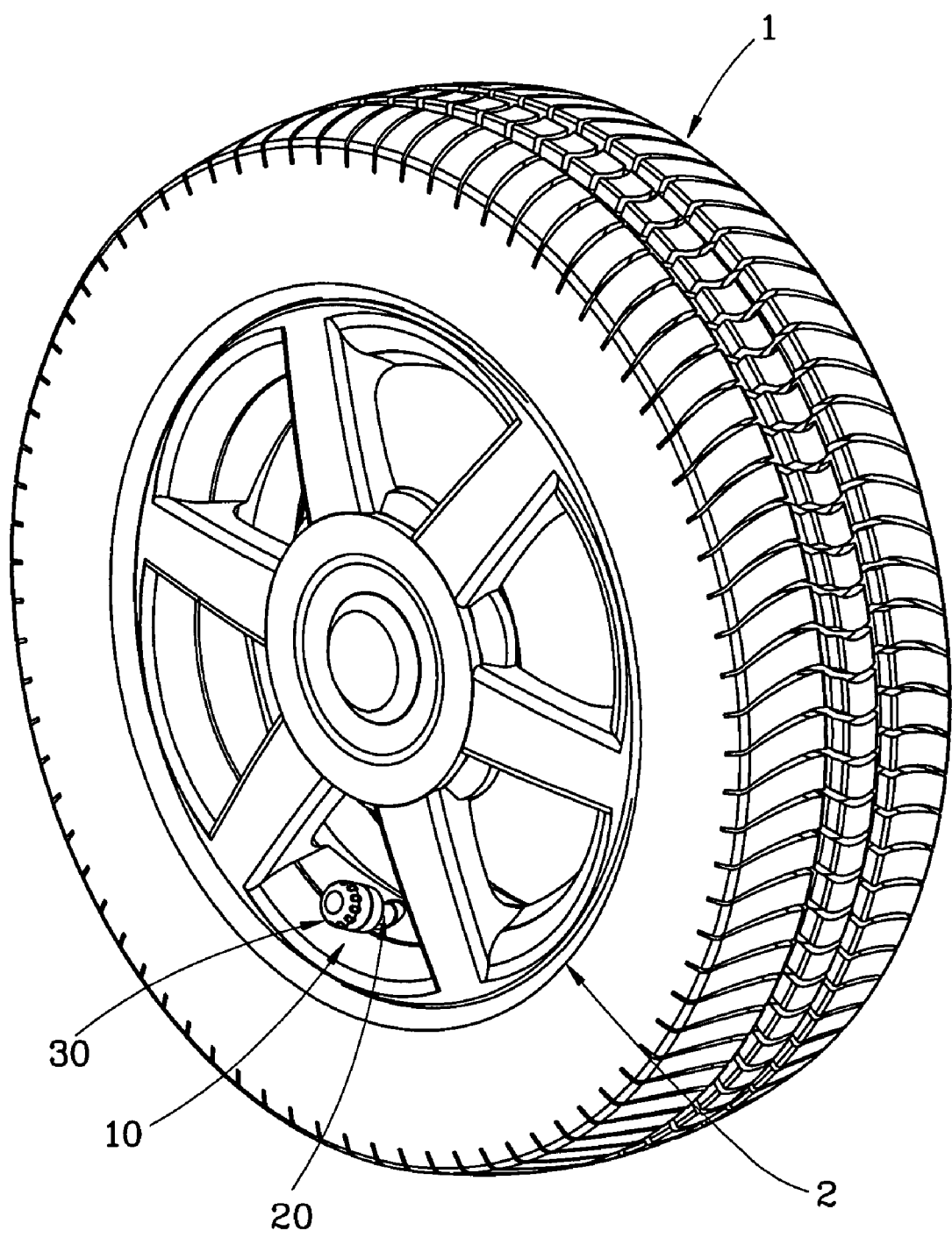
FIG. 5 is a schematic drawing showing that the attached tire pressure sensor and air nozzle assembly of the first exemplary embodiment of the present invention is installed in the rim of a vehicle wheel.

As shown in FIGS. 1-5, an attached tire pressure sensor and air nozzle assembly 10 in accordance with a first exemplary embodiment of the present invention comprises an air nozzle 20, an attached tire pressure sensor 30, and an anti-loosing device 40.

The air nozzle 20 is installed in the rim 2 of a vehicle wheel 1 and includes a metal tube 22, which is provided with an inside air passage 24 in air communication between the inside pressure of the vehicle wheel 1 and the outside open air, an outer thread 25 extending around the outer periphery of one end of the metal tube 22, a rubber shell 26 covering a part of the outer periphery of the metal tube 22 and having an annular front end edge 28 extending around the outer periphery of the metal tube 22 adjacent to the outer thread 25, and an air valve (not shown) inserted inside the air passage 24 for controlling the flowing direction of air and prohibiting discharge of air out of the vehicle wheel 1.

The attached tire pressure sensor 30 comprises a hollow body 32, and an electronic tire pressure sensor circuit (not shown) mounted inside the body 32. The body 32 has a protruding portion 34 axially extending from its one end, a coupling hole 36 axially defined in the protruding portion 34 in air communication with the inside space of the body 32 and the space outside the body 32, and an inner thread 38 formed in the coupling hole 36. The inner thread 38 of the attached tire pressure sensor 30 is threaded onto the outer thread 25 of the air nozzle 20 to aim the front end edge 39 (the end edge of the free end) of the protruding portion 34 at the annular front end edge 28 of the rubber shell 26 of the air nozzle 20.

The anti-loosing device 40 includes a rigid base 42 and a curved spring washer 44. The rigid base 42 is an annular metal disk having a first side 46, a second side 47 opposite to the first side 46, and a coupling hole 48 cut through the first side 46 and the second side 47. The curved spring washer 44 is made of a steel piece, having a part 49 fixedly fastened to the first side 46 of the rigid base 42 by means of spot welding. The anti-loosing device 40 is set between the air nozzle 20 and the attached tire pressure sensor 30 with the base 42 and the curved spring washer 44 respectively stopped against the annular front end edge 28 of the rubber shell 26 of the air nozzle 20 and the front end edge 39 of the protruding portion 34 of the attached tire pressure sensor 30.

When tightening the connection between the attached tire pressure sensor 30 and the air nozzle 20, the curved spring washer 44 of the anti-loosing device 40 is squeezed to produce a spring force against the front end edge 39 of the protruding portion 34 of the attached tire pressure sensor 30 and the annular front end edge 28 of the rubber shell 26 of the air nozzle 20, thereby holding down the attached tire pressure sensor 30 and the air nozzle 20 and preventing loosing of the connection between the air nozzle 20 and the attached tire pressure sensor 30 upon vibration or accidental impact of the vehicle wheel 1 during running of the vehicle.

The design of the rigid base 42 of the anti-loosing device 40 prohibits direct contact of the curved spring washer 44 with the annular front end edge 28 of the rubber shell 26 of the air nozzle 20, preventing the annular front end edge 28 of the rubber shell 26 from absorbing the spring force of the curved spring washer 44 to lower the effect of the curved spring washer 44 in holding down the air nozzle 20 and the front attached tire pressure sensor 30.

Figure 6:
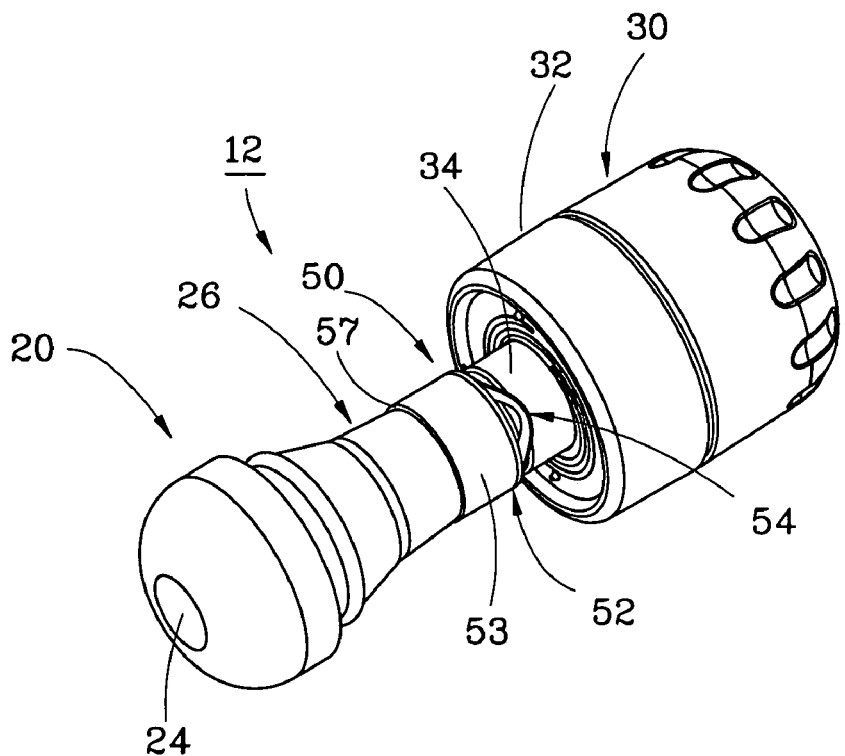
FIG. 6 is a perspective view of an attached tire pressure sensor and air nozzle assembly in accordance with a second exemplary embodiment of the present invention.
Figure 7:
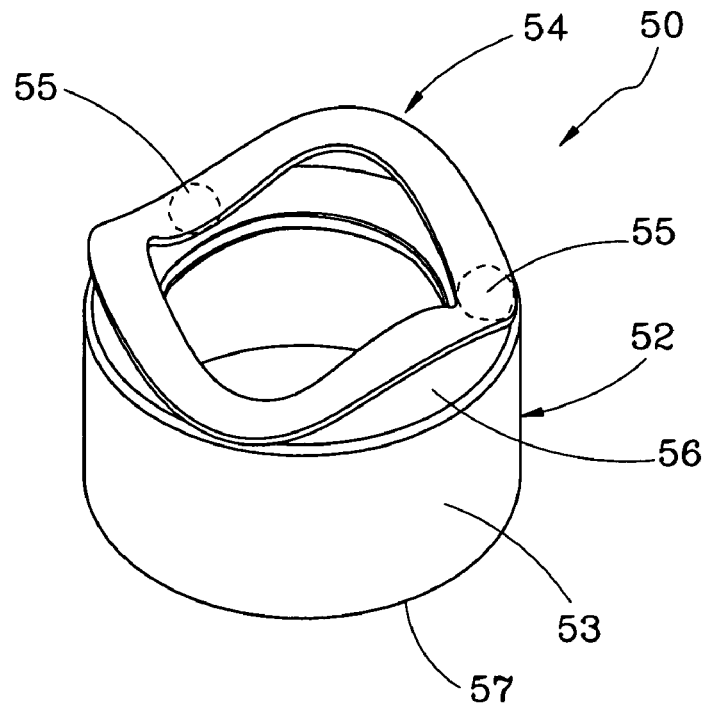
FIG. 7 is a perspective view in an enlarged scale of the anti-loosing device of the attached tire pressure sensor and air nozzle assembly shown in FIG. 6.

FIGS. 6 and 7 show an attached tire pressure sensor and air nozzle assembly 12 in accordance with a second exemplary embodiment of the present invention. Similar to the aforesaid first embodiment, this second embodiment comprises an air nozzle 20, an attached tire pressure sensor 30, and an anti-loosing device 50. The air nozzle 20 and the attached tire pressure sensor 30 according to this second embodiment are same as that of the aforesaid first embodiment. The rigid base 52 of the anti-loosing device 50 according to this second embodiment is a metal barrel 53 having a first side 56, a second side 57, and a coupling hole 58 axially cut through the first side 56 and the second side 57. The curved spring washer 54 of the anti-loosing device 50 has two portions 55 bonded to the first side 56 of the rigid base 52 by spot welding.

The anti-loosing device 50 is set between the air nozzle 20 and the front attached tire pressure sensor 30 with the metal barrel 53 sleeved onto the rubber shell 26 of the air nozzle 20 and the curved spring washer 54 stopped against the front end edge of the protruding portion 34 of the attached tire pressure sensor 30. This design enables the anti-loosing device 50 to have the same effect as the aforesaid first embodiment and to be firmly secured in place between the air nozzle 20 and the attached tire pressure sensor 30.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An attached tire pressure sensor and air nozzle assembly comprising:
    an air nozzle having an outer thread;
    an attached tire pressure sensor having a hollow body provided with a coupling hole and an inner thread formed in the coupling hole and threaded onto the outer thread of the air nozzle; and
    an anti-loosing device having a base provided with a first side, a second side opposite to the first side, and a coupling hole through the first side and the second side for insertion of the air nozzle, and a spring washer bonded to the first side of the base;
    wherein the anti-loosing device is sandwiched between the air nozzle and the attached tire pressure sensor in a way that the base is stopped against the air nozzle and the spring washer is stopped against the attached tire pressure sensor.

2. The attached tire pressure sensor and air nozzle assembly as claimed in claim 1, wherein the air nozzle comprises a metal tube provided at an outer periphery thereof with the outer thread, and a rubber shell partially covering the outer periphery of the metal tube and having an annular front end edge disposed adjacent to the outer thread; the hollow body of the attached tire pressure sensor comprises a protruding portion provided with the coupling hole; the base of the anti-loosing device is stopped against the annular front end edge of the air nozzle and the spring washer of the anti-loosing device is stopped against a front end edge of the protruding portion of the attached tire pressure sensor.

3. The attached tire pressure sensor and air nozzle assembly as claimed in claim 1, wherein the base of the anti-loosing device is an annular metal disk, and the spring washer is made of a steel piece having one portion thereof fixedly fastened to the first side of the base of the anti-loosing device by means of spot welding.

4. The attached tire pressure sensor and air nozzle assembly as claimed in claim 1, wherein the spring washer is a curved spring washer having two portions thereof fixedly bonded to the first side of the base of the anti-loosing device.

5. The attached tire pressure sensor and air nozzle assembly as claimed in claim 1, wherein the base of the anti-loosing device is a metal barrel, and the spring washer has two portions thereof fixedly fastened to the first side of the base of the anti-loosing device by spot welding.

* * * * *